United States Patent
Jiang et al.

(10) Patent No.: US 9,826,028 B2
(45) Date of Patent: Nov. 21, 2017

(54) AGGREGATING PLUG-IN REQUESTS FOR IMPROVED CLIENT PERFORMANCE

(71) Applicant: Facebook, Inc., Menlo Park, CA (US)

(72) Inventors: Changhao Jiang, San Jose, CA (US); Naitik Hemant Shah, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 253 days.

(21) Appl. No.: 14/705,374

(22) Filed: May 6, 2015

(65) Prior Publication Data

US 2015/0237120 A1    Aug. 20, 2015

Related U.S. Application Data

(63) Continuation of application No. 13/211,213, filed on Aug. 16, 2011, now Pat. No. 9,058,401.

(51) Int. Cl.
*G06F 15/16* (2006.01)
*H04L 29/08* (2006.01)
*G06F 17/22* (2006.01)

(52) U.S. Cl.
CPC .......... *H04L 67/10* (2013.01); *G06F 17/2247* (2013.01); *H04L 67/02* (2013.01)

(58) Field of Classification Search
CPC ...................................... H04L 67/10
See application file for complete search history.

*Primary Examiner* — Vivek Srivastava
*Assistant Examiner* — Nicholas Celani
(74) *Attorney, Agent, or Firm* — Baker Botts L.L.P

(57) ABSTRACT

In one embodiment, computer-readable instructions, when executed, cause a client browser to wait for all of the markup language in a document object model to be loaded, and upon loading, parse the document object model for supported tags, create placeholder frames for each supported tag, and bundle all the tags into a single meta-request for a server. Upon receiving each response, the instructions are further operable to cause the client browser to replace the hidden frames with its corresponding response, thereby reducing the number of socket connections from the client to the server.

18 Claims, 7 Drawing Sheets

```
<html>
<head>
...
</head>
<body>
```
301

```
//load fb JavaScript Library
<div id="fb-root"><div>
<script src="https://connect.facebook.net/fb.js>
FB.init();</script>
```
302

```
//registration widget iframe
<iframe src="https://www.facebook.com/plugins/registration.php?
        client_id=113869198637480&
redirect_uri=http%3A%2F%2Fdevelopers.facebook.com%2Ftools%2Fecho%2F&
        fields=name,birthday,gender,location,email"
    scrolling="auto"
    frameborder="no"
    style="border:none"
    allowTransparency="true"
    width="100%"
    height="330">
</iframe>
```
303

```
//registration widget
<fb:registration
  fields="name,birthday,gender,location,email"
  redirect-uri="https://developers.facebook.com/tools/echo/"
  width="530">
</fb:registration>
```
304

```
//like widget
<fb:like href="espn.go.com" send="true" width="450" show_faces="true" font=""></
fb:like>
```
305

```
//activity feed widget
<fb:activity site="espn.go.com" width="300" height="300" header="true" font=""
border_color="" recommendations="false"></fb:activity>
```
306

```
</body>
</html>
```
307

FIGURE 3

```
<iframe src="fb.com/pipe">
<script>
window.parent.frames.JBV5O  //"like" iframe name
OnWidgetArrive(JSON_obj1)  //JavaScript function
</script>
```
501

```
<script>
window.parent.frames.zMv9A // "acivity" iframe name
OnWidgetArrive(JSON_Obj2)
</script>
```
502

FIGURE 5

AGGREGATING PLUG-IN REQUESTS FOR IMPROVED CLIENT PERFORMANCE

PRIORITY

This application is a continuation under 35 U.S.C. §120 of U.S. patent application Ser. No. 13/211,213, filed 16 Aug. 2011.

TECHNICAL FIELD

The present disclosure relates generally to aggregating multiple plug-in requests on a web page and to handling the placement of content associated by a response by a server.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system.

The social networking system may provide plug-ins to developers of third-party web sites, that allow the developers to leverage social networking assets, such as log-in information and friend lists, or permit actions on the social networking system by selecting elements on the third-party website.

SUMMARY

Particular embodiments relate to a script residing on the third-party web site that aggregates all calls to the social networking system into a single request in order to enhance responsiveness. These and other features, aspects, and advantages of the disclosure are described in more detail below in the detailed description and in conjunction with the following figures.

BRIEF DESCRIPTION OF THE DRAWINGS

FIG. 3 illustrates an example markup language of a webpage using a separate inline frame for each plug-in.
FIG. 5 illustrates an example markup language of a webpage aggregating social networking plug-in request into a single inline frame.

DETAILED DESCRIPTION

Figure 1:
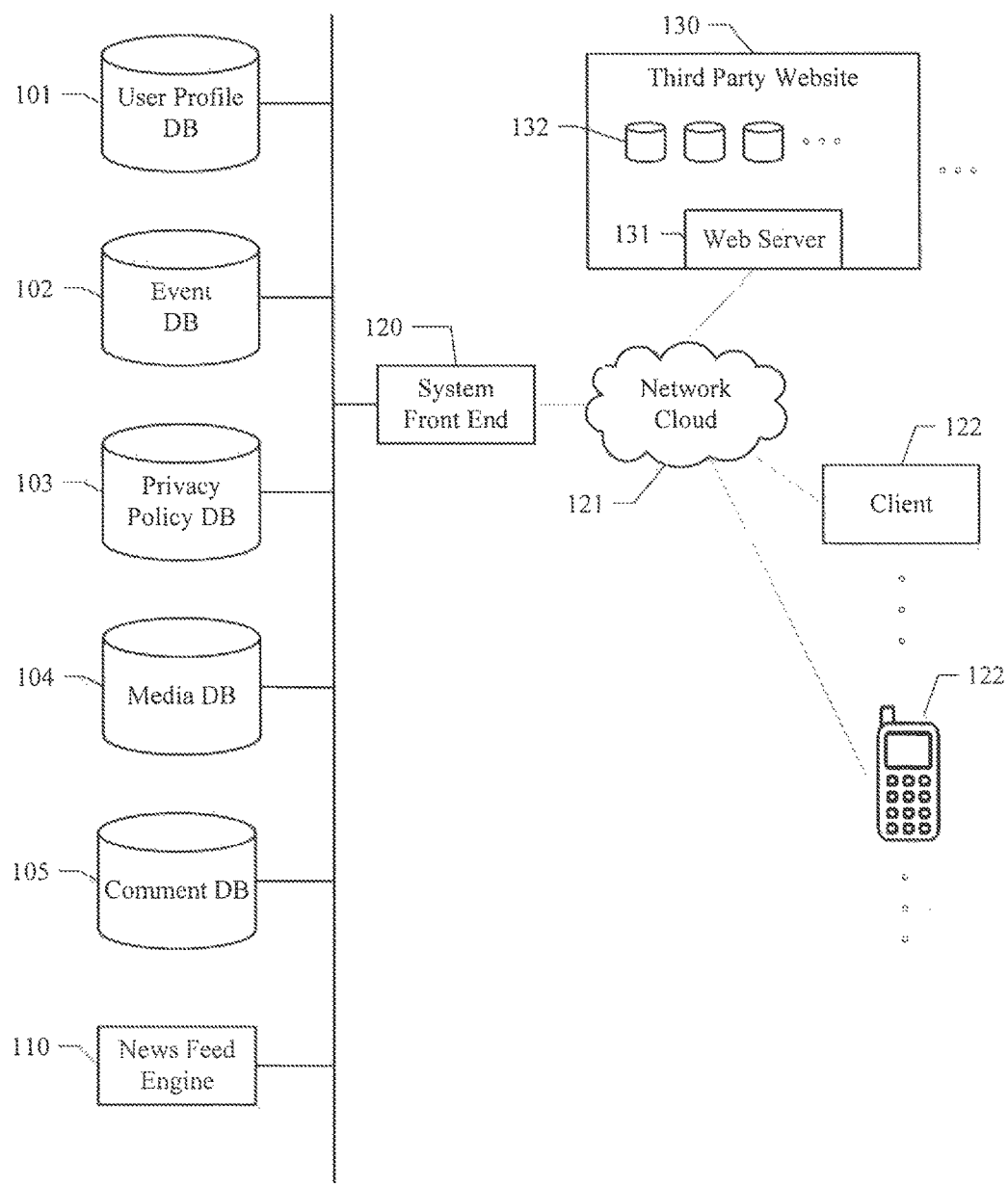
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

A social networking system may support a news feed service. A news feed is a data format typically used for providing users with frequently updated content. A social networking system may provide various news feeds to its users, where each news feed includes content relating to a specific subject matter or topic, and/or other users. Various pieces of content may be aggregated into a single news feed. In some implementations, a social networking system may provide a news feed that includes selected entries corresponding to activities of a user's first-degree contacts and/or pages or topics that a user has indicated an interest. Individual users of the social networking system may subscribe to specific news fees of their interest. U.S. Pat. No. 7,669,123, incorporated by reference in its entirety for all purposes, describes a system that can be used to dynamically provide a news feed. A group of related actions may be presented together to a user of the social networking system in the same news feed. For example, a news feed concerning the event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store media data (e.g., photos, or video clips) in media database 104. In particular embodiments, databases 101, 102, 103, and 104 may be operably connected to the social networking system's front end 120 and news feed engine 110. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, a user of the social networking system may upload one or more media files to media database 104. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 104.

In particular embodiments, news feed engine 110 may access user profile database 101, event database 102, and media database 104 for data about a particular user of the social networking system, and assemble a list of one or more activities as news items for a user or a set of users. In particular embodiments, news feed engine 110 may access privacy policy database 103 and determines a subset of news items based on one or more privacy settings. In particular embodiments, news feed engine 110 may compile a dynamic list of a limited number of news items in a ranked or sorted order. In particular embodiments, news feed engine 110 may provide links related to one or more activities in the news items, and links providing opportunities to participate in the activities. For example, a news feed can comprise wall posts, status updates, comments, and recent check-ins to a place (with a link to a web page of the place).

In other embodiments, news feed engine 110 may access user profile database 101, event database 102, and media database 104 and compile a dynamic list of a limited number of news items about a group of related actions received from users of the social networking system (i.e., a news feed). For example, a news feed can comprise an event that a user may schedule and organize through the social networking system (with a link to participate the event), messages about the event posted by the user and other participants of the event, and photos of the event uploaded by the user and other participants of the event.

Users of a social networking system can access other websites or third party websites (e.g., ESPN.com, www.youtube.com). In particular embodiments, a user using client device 122 may connect to and communicate with third party website 130 through network cloud 121. Third party website 130 may comprise web server 131 operatively connected to one or more data stores 132 storing user data and web page information. User data may include, for example, user name, user profile picture, and user profile information (e.g., location, affiliation, interest). Web page information may include, for example, page layout information, scripts, web page content such as text (e.g., ASCII or HTML), media data (e.g., graphics, photos, video clips), and executable code objects (e.g., a game executable within a browser window or frame). In particular embodiments, a user may use a web browser or special-purpose client application hosted on client device 122 to access their party website 130 by sending an HTTP request to web server 131, causing web server 131 to access the one or more data stores 132 and construct one or more web pages or frames displayed in the web browser or the special-purpose client application.

A social networking system may communicate and access third party website 130, and vise versa, through network cloud 121. For example, a web page constructed by third party website 130 for a user of a social networking system can contain information from the social networking system, such as a frame displaying profile pictures of the user's first-degree friends who are currently active on third party website 130. For example, a user's user profile page of a social networking system can contain an embedded video clip that the user posted on third party website 130. In some embodiments, a web page constructed by a first web site may include one or more inline references that cause the client device 122 to access and display content from a second website by incorporating in the web page's HTML document Uniform Resource Locations (URLs) and/or script code (e.g., JavaScript, PHP, AJAX) that causes a client application hosted on the client device 122 to access the second website to dynamically provide content specified by the script code (e.g., profile pictures). In some embodiments, a browser cookie installed by a second website on client device 122 can be used to facilitate accessing the second website. For example, requests transmitted to the social networking system for a particular user may include a browser cookie or other token to enable automatic authentication and access to the social networking system for the particular user (e.g., to access and display profile pictures of the particular user's first-degree friends), without the particular user having to manually enter user ID and password information of the social networking system.

In particular embodiments, the social networking system may provide application programming interfaces (APIs) that allow developers of third-party websites to access user information or social graph information from the social networking system, or permit specific actions on the social networking system through the third-party website. These plug-ins, or "widgets," may be developed by the social networking system owners and provided to developers of third-party sites as "drop" in blocks of code or scripts that they may easily integrate with their websites. As an added benefit of providing these plug-ins, the social networking system becomes aware of what website particular users are visiting, thereby building a more complete profile of a particular user in order to target advertising and deliver personalized content to the user. So long as a particular user is concurrently logged into the social networking system, merely visiting a third-party page containing any social networking plug-ins gives the social networking system enough information to associate the external page view with a particular user account. In particular embodiments, this browsing history tracking is achieved by matching originating IP addresses. In particular embodiments, the historical browsing history for a user is stored indefinitely for future mining and analysis.

Figure 2:
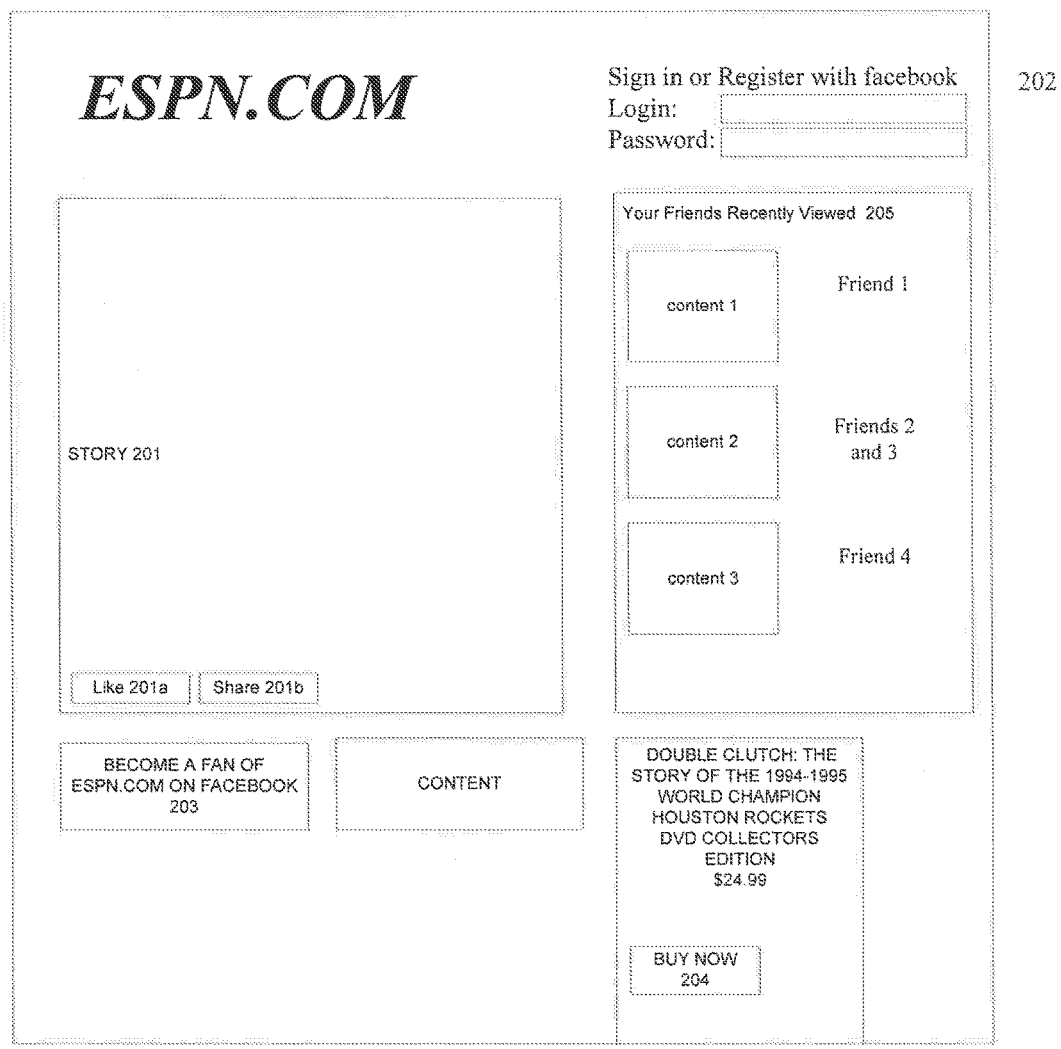
FIG. 2 illustrates an example web page containing social-networking plug-ins.

FIG. 2 illustrates an example web page having social networking plug-ins or "widgets." FIG. 2 depicts website 200, in this case, "ESPN.com" having a plurality of plug-ins or "widgets." For example, login 202 allows a user to sign in with his or her social networking credentials. In particular embodiments, certain web pages require users create an account in order to access particular content. For example, one may have to register to "ESPN Insider" to access certain content. The registration process is generally arduous, and requires information that the user has already entered when registering for the social networking system (e.g., name, address, email address, contact information, interests, and the like). In order to enhance the user experience and spare the users the arduous registration process, social networking system may provide third-party web developers a widget that allows them to pull this information easily from the social networking system. Third-party website developer may insert the code for this widget into the markup language for a given page, which results in the user browser rendering login element 202. Login element 202, as stated, allows a user to utilize his or her social networking credentials, and the information stored in his or her profile, to quickly register for an account on third-party website 202.

In particular embodiments, third-party website 200 may include buttons 201*a* and 201*b* that, when activated, perform actions on the social networking system. For example, third-party website 200 maintains its own content 201. However, a particular user may wish to express his affinity for content 201 by "liking" it. Typically, users may only "like" elements that exist on the social network themselves, or elements that are represented on the social network, such as a newsfeed story. However, by providing a "like" widget to third-party developers, users may "like" objects that exist off the social network; upon clicking button 201*a*, a newsfeed story will appear on the user's wall indicating he "liked" content 201. In particular embodiments, the newsfeed story also links to content 201. In particular embodiments, "share" button 201*b* allows the user to immediately post content 201 on his or her wall from a third-party website.

In particular embodiments, the social networking system permits third-party servers to access its historical database of browsing history for a plurality of users. For example, activity feed 205 may display the stories or content read by the friends of a viewing user. When a user visits website 200, a plug-in generating activity feed 205 queries the user's social graph and the social networking system's browsing history to determine which friends of the user have recently viewed website 200, and what content they have viewed. In particular embodiments, activity feed 205 includes stories that friends of the viewing user have shared, liked, commented on, or otherwise interacted with. In particular embodiments, engaged content or stories (i.e., content that has been interacted with through liking or sharing, etc.) is more highly ranked in activity feed area 205 than stories or content that have merely been viewed. In particular embodiments, certain popular websites, such as Yelp!, may be pre-approved to query all user data from the social networking system to personalize website 200 for the visiting user.

In particular embodiments, third-party website 200 may include an "action" button 203, which permits other actions on the social network. In the example of FIG. 2, selecting action button 203 immediately makes the user a "fan" of the node associated with ESPN.com on the social networking system. In particular embodiments, activity button 203 may integrate with other applications on the social networking system. For example, a user may have a particular application that shares his or her concert lineup on their wall. The concert lineup may be displayed on the concert organizer's page, with a "add to my line-up" button for each act. Selecting this button would automatically add the performance to the user's lineup and generate a newsfeed story conveying the same. In particular embodiments, these applications may be pre-approved and installed on the user's social networking profile when they click action button 203. This disclosure contemplates any manner of on-network social networking activities actuated by action button 203.

In particular embodiments, third-party website 200 may include a "buy now" button generated by a payment plug-in. In such embodiments, a user may wish to enter payment information, such as credit card number, shipping and billing address, expiration date, and the like, so that he or she may utilize "one-click" shopping on a third-party website without having to register for the third-party website's payment processing system. In such a manner, the user's experience is greatly simplified, and the social networking system gains another insight into the users' habits (in this case, what products the user purchases) for further delivery of personalized content.

Other social plug-ins allow users to send content to other users, view the comments on any piece of content, push recommendations to the viewing user, display profile pictures of the friends of the visiting user, and the like. This disclosure contemplates any manner of social plug-in or widget for retrieving information from a social networking system from a third-party site, or, alternatively, delivering content or actions to the social networking system.

FIG. 3 illustrates example pseudo markup language code representing an example third-party website 130 having social plug-ins. In particular embodiments, web server 131 of third party website 130 may include in structured documents transmitted to client applications HTML or other code objects that cause the client applications to transmit requests to the social networking system. The request causes the social networking system to delivery the requested content to the client.

301 includes a block of pseudo-code that initializes the markup language page, including the head of the HTML or other markup language page as well as the body. Code segment 302 loads a JavaScript library provided by the social networking system. In particular embodiments, this may be hosted by the social networking system (as seen in 302, it is hosted at a social networking server). In particular embodiments, it may be stored on web server 131. Once the JavaScript library is loaded, the browser of any site visiting the page will execute the JavaScript calls to make requests to the social networking system.

For example, registration widget 304, like widget 305, and activity feed widget 306 all utilize JavaScript calls from the JavaScript library loaded in code segment 302. In particular embodiments, each JavaScript call creates a separate inline frame (iframe) in the document that retrieves the widget from a server from the social networking system. For example, code segment 304 generates an iframe and requests the name, birthday, gender, location, and email address from the social network for a visiting user for the purposes of registration. Similarly code segment 305 generates an iframe and requests a "like" button for the url: "http://espn.go.com" from the social networking system. Finally, code segment 306 generates an iframe and requests the recent activity of friends of the visiting user for the same URL. In particular embodiments, each iframe retrieves its content from an external site on the social networking domain. For example, iframe 304 may be replaced with fb.com/plugins/like?name_birthday_gender_location_email. Similarly, the iframe for activity widget 306 may render the resource from fb.com/plugins/activity? (with the various parameters appearing after the "?" in the URL. Finally, the browser may render iframe 305 as fb.com/plugins/like?[parameters]. This disclosure contemplates any manner of retrieving plug in content.

In particular embodiments, a JavaScript library does not have to be loaded. For example, pseudo-code segment 303 performs the same function as code segment 304, however it lacks any calls to a specialized JavaScript library provided by the social network. Code segment 303 creates an iframe from the source URL, which pulls the registration element from the social networking system's servers for rendering into the website. Code segment 307 provides terminators for the web page for proper browser rendering.

The foregoing iframes each constitute a separate connection from the visiting user's browser to the social networking system servers. Thus, in the example of FIG. 3, 4 socket requests would be made from the client browser to the servers of the social networking system. In particular embodiments, where the third-party developer has a large number of social networking widgets, the number of TCP socket connections may become excessive, subsequently causing long load times and general unresponsiveness for the visiting user. A large number of separate iframe elements resulting in concurrent TCP connections may also be browser limited. For example, the Google Chrome browser permits 11 concurrent connections to the same domain, while older browsers, such as Internet Explorer 6, allowed as few as two concurrent TCP connections to the same domain. The current version of Internet Explorer 8.0 allows up to 6 parallel HTTP 1.0/1.1 connections to the same domain. Thus, a large number of separate iframes may result in slow or incorrect rendering, or page incompatibility across browser platforms.

Figure 4:
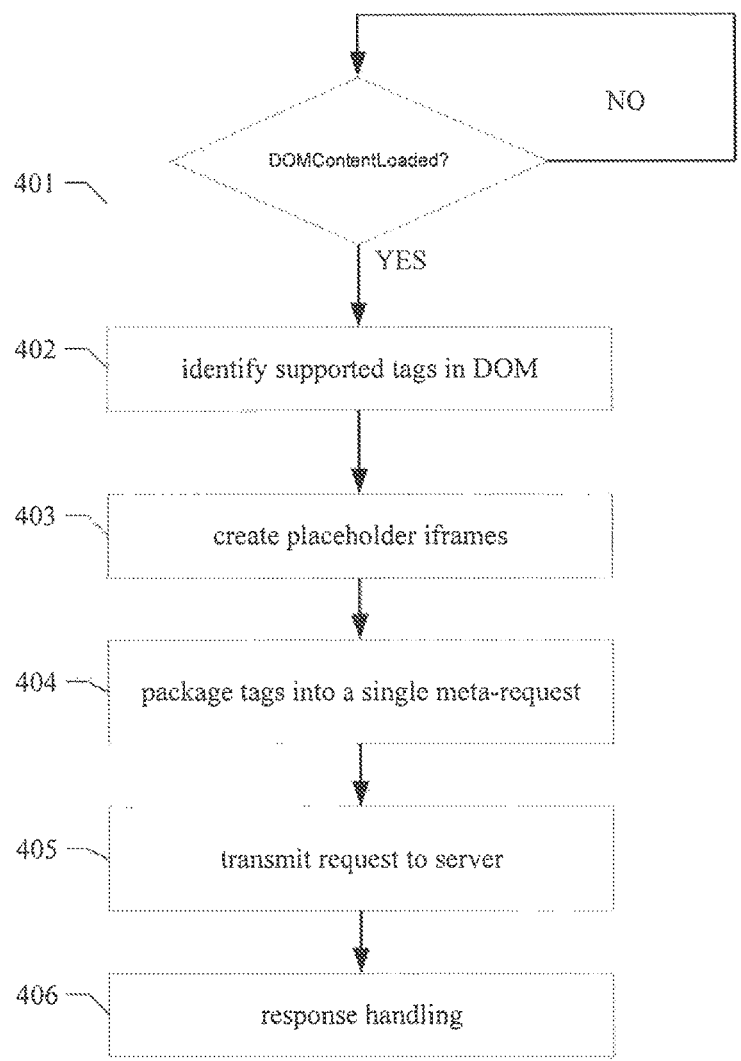
FIG. 4 illustrates an example method of aggregating social networking plug-in requests.

The present invention remedies this shortcoming by aggregating multiple requests to the social networking system into a single iframe. FIG. 4 illustrates an example method of aggregating multiple requests from multiple social networking widgets or plug-ins. At Step 401, the client browser, executing a block of JavaScript code, awaits the generation of a document object model (DOM) by the client browser. As well-known in the art, the browser layout engine parses HTML into a DOM. In particular embodiments, the browser waits for a triggering event, such as the DOMContentLoaded event. The DOMContentLoaded event fires when parsing of the current page is complete, including the underlying markup language but excluding actual content such as images and movies, whereas the load event fires when all files have finished loading from all resources, including ads and images.

Upon detection of the DOMContentLoaded event, the client browser at Step 402 identifies the supported tags in the DOM. In particular embodiments, the tags are JavaScript calls such as <fb:like> or <fb:registration>. In particular embodiments, the tags are a particular custom markup language, such as FBML or XFBML. In particular embodiments, non JavaScript social plug-ins, such as registration iframe 303 are not aggregated with the JavaScript calls (such as 304, 305, and 306 in FIG. 3) and are rendered as their own iframe. Although this disclosure describes detecting supported tags, this disclosure contemplates any suitable method of requesting a plug-in or content from a third-party site. For example, a third-party site may utilize the 'div' HTML tag with one or more particular CSS class names to signal plug-ins to be loaded without using special tags. After searching the DOM for supported tags, the process proceeds to Step 403.

At Step 403, the script instructs the client browser to generate placeholder iframes for each of the identified supported tags. Because the supported tags are traditionally rendered as visible iframes, the social networking plug-ins or widgets must still own the space in the webpage. The script generates placeholder iframes to occupy the required spaces on the webpage. In particular embodiments, the placeholder iframes are generated with the same dimensions as the dimensions requested by the supported tag. In particular embodiments, the iframe may be dynamically resized. In particular embodiments, the placeholder iframe is an empty iframe hosted by the social networking system. In particular embodiments, the empty iframe is hosted by a third party hosting solution. For example, the script may generate the placeholder by inserting the following pseudo-code:

<iframe src="http://akamai.fb.com/empty">

In particular embodiments, the placeholder iframe may be cached on the client browser in order to improve responsiveness and overall site speed. In particular embodiments, each placeholder iframe is assigned a unique name or identifier. In particular embodiments, the names or identifiers are random strings. In particular embodiments, the iframe name or identifier is inserted into the iframe name attribute. For example, the JavaScript may cause the client browser to convert "like" widget 305 into: <iframe src="akamai.fb.com/empty" name="JBv5O">.

At Step 404 the script causes the client's browser to package all the tags into a single meta-request by generating a hidden iframe containing all the identified tags. In particular embodiments, the hidden iframe containing all the tags is fully self-contained; as each widget is delivered, the browser may render the widget into the correct position; i.e., the position of its corresponding placeholder iframe. The hidden iframe includes a bundle of all the parameters of the plug-in requests contained in the visible iframes for transmission to the social networking server. As previously discussed, each supported tag (visible iframe) has its own set of parameters to be sent to the server. For example, referring back to FIG. 3, iframe 304 includes the parameters ("name, birthday, gender, location, email") and a width parameter. As another example, iframe 305, the "like" button has a parameter for the URL (espn.go.com) as well as show faces="true." Finally, iframe 306, the activity feed widget, has parameters dictating border color and recommendations="false." Thus, each set of parameters is specific to the plug-in itself, and the hidden iframe contains all the parameters parsed from the supported tags.

The hidden iframe also contains, for each set of parameters, the unique identifier of its corresponding placeholder iframe. Therefore, the social networking server may associate each response with the corresponding iframe in which it is to be rendered. In particular embodiments, the browser security model allows communication between all iframes having the same top-level domain. Thus, the hidden iframe serves as a transport pipe that may facilitates communication between the social networking server and each iframe, as well as between each iframe, via the name attribute tags.

At Step 405, the JavaScript object, when executed by the client's browser, transmits the packaged requests to one or more servers of the social networking system. In particular embodiments, the request includes the script calls for the various tags, the parameters for each tag, and the name of its corresponding placeholder iframe.

At Step 406, the JavaScript object handles responses from the server. Each response is received from the server independently and whenever the server is ready; there is no aggregation on the server side. From the server's perspective, it first unbundles the bundle of requests, and, for each iframe, renders the assets required by each iframe one-by-one. The server transmits the assets to the client as soon as they are rendered, and the assets may replace the placeholder iframes progressively. The server transmits the responses progressively by writing to the open socket as part of the HTTP response. In particular embodiments, the responses are all tagged with a <script> tag, so that the client may render the iframes independently of each other. The client uses the name in the response as a lookup for the placeholder iframes, and injects the result into the empty frame.

FIG. 5 depicts the response that may be delivered from the server. Code segment 501 includes the hidden iframe and the first script response; in this case, the "like" widget. The window.parent.frames command merely identifies that the output should be placed into the placeholder iframe having the same name as the random string assigned to the "like" button. Upon receiving the render assets, the browser makes the JavaScript function call, for example, "OnWidgetArrive( )", which actually unpackages the render assets and renders the widget into the placeholder iframe. In particular embodiments, the OnWidgetArrive( ) function is defined in the page for the placeholder iframe, or empty shell page.

In some implementations, the render assets are packaged in a JavaScript Object Notation (JSON) object. In particular embodiments, the JSON encoded object includes all the HTML, JavaScript, and other assets needed to populate and render the iframe. In particular embodiments, the JSON object includes a cascading style sheet (CSS), HTML, and Javascript. In particular embodiments, the JSON object dictates the order in which the CSS, HTML, and JavaScript are loaded. In particular embodiments, CSS is loaded first, followed by HTML, and finally JavaScript. Although this disclosure describes a response packaged as a JSON object, this disclosure contemplates any method of delivering a response. For example, in particular embodiments, the response is embedded in another invisible HTML tag, and JavaScript is utilized to pull the content from the HTML object. This disclosure contemplates any suitable mechanism of delivering a dedicated object to the client browser in response to a plug-in request.

Figure 6:
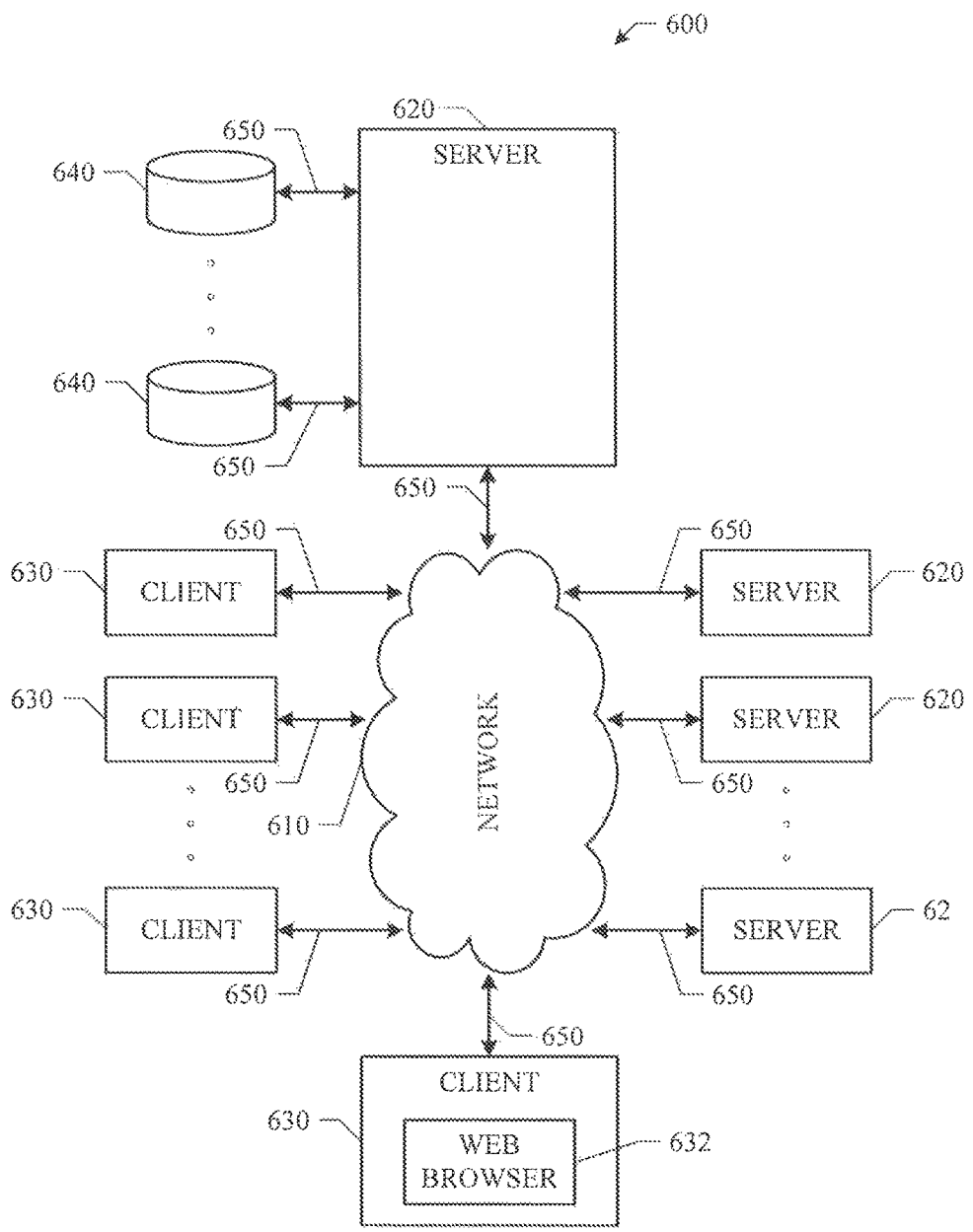
FIG. 6 illustrates an example network environment.

While the foregoing embodiments may be implemented in a variety of network configurations, the following illustrates an example network environment for didactic, and not limiting, purposes. FIG. 6 illustrates an example network environment 600. Network environment 600 includes a network 610 coupling one or more servers 620 and one or more clients 630 to each other. Network environment 600 also includes one or more data storage 640 linked to one or more servers 620. Particular embodiments may be implemented in network environment 600. For example, social networking system frontend 120 may be written in software programs hosted by one or more servers 620. For example, event database 102 may be stored in one or more storage 640. In particular embodiments, network 610 is an intranet, an extranet, a virtual private network (VPN), a local area network (LAN), a wireless LAN (WLAN), a wide area network (WAN), a metropolitan area network (MAN), a portion of the Internet, or another network 610 or a combination of two or more such networks 610. The present disclosure contemplates any suitable network 610.

One or more links 650 couple a server 620 or a client 630 to network 610. In particular embodiments, one or more links 650 each includes one or more wired, wireless, or optical links 650. In particular embodiments, one or more links 650 each includes an intranet, an extranet, a VPN, a LAN, a WLAN, a WAN, a MAN, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, one or more data storages 640 may be communicatively linked to one or more servers 620 via one or more links 650. In particular embodiments, data storages 640 may be used to store various types of information. In particular embodiments, the information stored in data storages 640 may be organized according to specific data structures. In particular embodiment, each data storage 640 may be a relational database. Particular embodiments may provide interfaces that enable servers 620 or clients 630 to manage, e.g., retrieve, modify, add, or delete, the information stored in data storage 640.

In particular embodiments, each client 630 may be an electronic device including hardware, software, or embedded logic components or a combination of two or more such components and capable of carrying out the appropriate functions implemented or supported by client 630. For example and without limitation, a client 630 may be a desktop computer system, a notebook computer system, a netbook computer system, a handheld electronic device, or a mobile telephone. The present disclosure contemplates any suitable clients 630. A client 630 may enable a network user at client 630 to access network 630. A client 630 may enable its user to communicate with other users at other clients 630.

A client 630 may have a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 630 may enter a Uniform Resource Locator (URL) or other address directing the web browser 632 to a server 620, and the web browser 632 may generate a Hyper Text Transfer Protocol (HTTP) request and communicate the HTTP request to server 620. Server 620 may accept the HTTP request and communicate to client 630 one or more Hyper Text Markup Language (HTML) files responsive to the HTTP request. Client 630 may render a web page based on the HTML files from server 620 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 7:
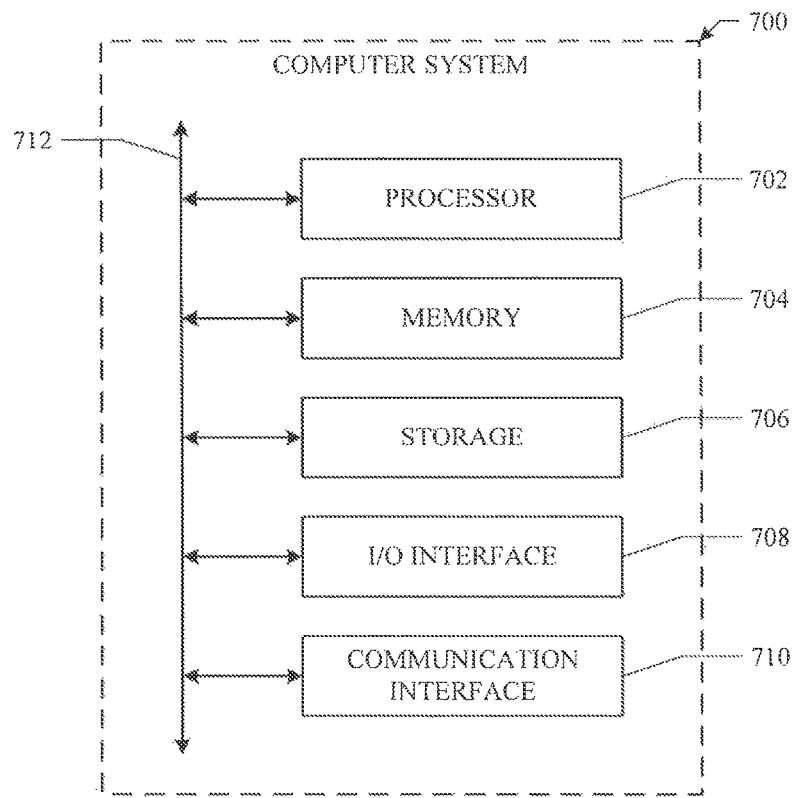
FIG. 7 illustrates an example computer system.

FIG. 7 illustrates an example computer system 700, which may be used with some embodiments of the present invention. This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. The present disclosure contemplates processor 702 including any suitable number of any suitable internal caches, where appropriate. As an example and not by way of limitation, processor 702 may include one or more instruction caches, one or more data caches, and one or more translation look-aside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. The present disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 704 may include one or more memories 702, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
by one or more computing systems of a social-networking system, receiving, from a client system, a packaged request comprising:
one or more requests to retrieve one or more dedicated objects, and
for each request, an indication of a corresponding placeholder frame;
by one or more computing systems of the social-networking system, progressively rendering the one or more dedicated objects, in response to the packaged request, wherein each dedicated object is executable on a webpage to access information from the social-networking system or to perform an action on the social-networking system; and
by one or more computing systems of the social-networking system, progressively sending one or more responses to the client system, each response comprising a rendered dedicated object and a name for a corresponding placeholder frame, wherein each response is sent in response to the associated dedicated object being rendered.

2. The method of claim 1, wherein the indication of a corresponding placeholder frame comprises a unique identifier of the corresponding placeholder frame.

3. The method of claim 1, wherein the package request comprises one or more parameters for each of the one or more requests to retrieve one or more dedicated objects.

4. The method of claim 1, wherein each dedicated object comprises a JSON object.

5. The method of claim 4, wherein each JSON object comprises a CSS file, HTML file, and JavaScript code.

6. The method of claim 1, wherein the placeholder frames each comprise a cached asset.

7. One or more computer-readable non-transitory storage media embodying software that is operable when executed to:
receive, from a client system, a packaged request comprising:
one or more requests to retrieve one or more dedicated objects, and
for each request, an indication of a corresponding placeholder frame;
progressively render the one or more dedicated objects, in response to the packaged request, wherein each dedicated object is executable on a webpage to access information from a social-networking system or to perform an action on the social-networking system; and
progressively send one or more responses to the client system, each response comprising a rendered dedicated object and a name for a corresponding placeholder frame, wherein each response is sent in response to the associated dedicated object being rendered.

8. The media of claim 7, wherein the indication of a corresponding placeholder frame comprises a unique identifier of the corresponding placeholder frame.

9. The media of claim 7, wherein the package request comprises one or more parameters for each of the one or more requests to retrieve one or more dedicated objects.

10. The media of claim 7, wherein each dedicated object comprises a JSON object.

11. The media of claim 10, wherein each JSON object comprises a CSS file, HTML file, and JavaScript code.

12. The media of claim 7, wherein the placeholder frames each comprise a cached asset.

13. A system comprising:
one or more processors; and
a memory coupled to the processors comprising instructions executable by the processors, the processors operable when executing the instructions to:
receive, from a client system, a packaged request comprising:
one or more requests to retrieve one or more dedicated objects, and
for each request, an indication of a corresponding placeholder frame;
progressively render the one or more dedicated objects, in response to the packaged request, wherein each dedicated object is executable on a webpage to access information from a social-networking system or to perform an action on the social-networking system; and
progressively send one or more responses to the client system, each response comprising a rendered dedicated object and a name for a corresponding placeholder frame, wherein each response is sent in response to the associated dedicated object being rendered.

14. The system of claim 13, wherein the indication of a corresponding placeholder frame comprises a unique identifier of the corresponding placeholder frame.

15. The system of claim 13, wherein the package request comprises one or more parameters for each of the one or more requests to retrieve one or more dedicated objects.

16. The system of claim 13, wherein each dedicated object comprises a JSON object.

17. The system of claim 16, wherein each JSON object comprises a CSS file, HTML file, and JavaScript code.

18. The system of claim 13, wherein the placeholder frames each comprise a cached asset.

* * * * *